US007198845B2

(12) United States Patent
Van Hasselt et al.

(10) Patent No.: US 7,198,845 B2
(45) Date of Patent: Apr. 3, 2007

(54) SHAPED TRILOBAL PARTICLES

(75) Inventors: Bastiaan Willem Van Hasselt, Amsterdam (NL); Carolus Matthias Anna Maria Mesters, Amsterdam (NL)

(73) Assignee: Shell Oil Company, Houston, TX (US)

(*) Notice: Subject to any disclaimer, the term of this patent is extended or adjusted under 35 U.S.C. 154(b) by 180 days.

(21) Appl. No.: 10/485,247

(22) PCT Filed: Jul. 30, 2002

(86) PCT No.: PCT/EP02/08540

§ 371 (c)(1), (2), (4) Date: Jan. 30, 2004

(87) PCT Pub. No.: WO03/013725

PCT Pub. Date: Feb. 20, 2003

(65) Prior Publication Data

US 2004/0185244 A1 Sep. 23, 2004

(30) Foreign Application Priority Data

Aug. 1, 2001 (EP) ................................. 01202922

(51) Int. Cl.
*B32B 5/16* (2006.01)

(52) U.S. Cl. ...................... 428/402; 428/403; 549/259; D21/486; D21/484; D21/479

(58) Field of Classification Search ................ 428/402, 428/403; 549/259
See application file for complete search history.

(56) References Cited

U.S. PATENT DOCUMENTS 3,764,565 A * 10/1973 Jacobs et al. ............... 502/305
4,628,001 A * 12/1986 Sasaki et al. ............... 428/367
4,975,032 A * 12/1990 Arai et al. .................. 418/150
6,005,121 A * 12/1999 Ebner et al. ................ 549/259

FOREIGN PATENT DOCUMENTS

| | | |
|---|---|---|
| EP | 0220933 | 5/1987 |
| EP | 4464633 | 1/1992 |
| EP | 0678331 | 10/1995 |
| GB | 1446175 | 8/1976 |

OTHER PUBLICATIONS

I. Naka, et al ( J. Japan Petrol. Inst., vol. 23, No. 4, 1980, pp. 268-273), entitled: Hydrodesulphurisation Activity of Catalysts with Non-Cylindrical Shape.

International Search Reported mailed Nov. 29, 2002.

* cited by examiner

*Primary Examiner*—Leszek Kiliman
(74) *Attorney, Agent, or Firm*—Charles W. Stewart; Leonard P. Miller

(57) ABSTRACT

An elongate, shaped particle having three protrusions each extending from and attached to a central position aligned along the central longitudinal axis of the particle, the cross-section of the particle occupying the area encompassed by the outer edges of six outer circles around a central circle minus the area occupied by three alternating outer circles, wherein each of the six outer circles is touching two neighbouring outer circles and wherein three alternating outer circles are equidistant to the central circle, have the same diameter, and may be attached to the central circle.

65 Claims, 1 Drawing Sheet

SHAPED TRILOBAL PARTICLES

FIELD OF THE INVENTION

The present invention relates to formed particles having a specific shape which particles may be employed in a wide variety of duties, catalytic or non-catalytic. They can be suitably applied to prevent or substantially reduce fouling of catalyst beds exposed to charges containing fouling material, thereby reducing increases in pressure drop. They can also be applied in hydroprocessing, e.g. in hydrodesulphurisation and hydrocracking, e.g. to produce middle distillates from paraffinic material obtained via a Fischer-Tropsch process.

BACKGROUND OF THE INVENTION

In the past a tremendous amount of work has been devoted to the development of particles, in particular catalytically active particles, for many different processes. There has also been a considerable effort to try to understand the advantages and sometimes disadvantages of effects of shape when deviating from conventional shapes such as pellets, rods, spheres and cylinders for use in catalytic as well as non-catalytic duties.

Examples of further well-known shapes are rings, cloverleafs, dumbells and C-shaped particles. Considerable efforts have been devoted to the so-called "polylobal"-shaped particles. Many commercial catalysts are available in TL (Trilobe) or QL (Quadrulobe) form. They serve as alternatives to the conventional cylindrical shape and often provide advantages because of their increased surface-to-volume ratio which enables the exposure of more catalytic sites thus providing more active catalysts.

An example of a study directed to effects of different shapes on catalytic performance can be found in the article by I. Naka and A. de Bruijn (J. Japan Petrol. Inst., Vol. 23, No. 4, 1980, pages 268–273), entitled "Hydrodesulphurisation Activity of Catalysts with Non-Cylindrical Shape". In this article experiments have been described in which non-cylindrical extrudates with cross-sections of symmetrical quadrulobes, asymmetrical quadrulobes and trilobes as well as cylindrical extrudates with nominal diameters of 1/32, 1/16 and 1/12 inch were tested in a small bench scale unit on their hydrodesulphurisation activity (12% wt $MoO_3$ and 4% wt CoO on gamma alumina). It is concluded in this article that the HDS activity is strongly correlated with the geometrical volume-to-surface ratio of the catalyst particles but independent of catalyst shape.

In EP-A-220933, published in 1987, it is described that the shape of quadrulobe-type catalysts is important, in particular with respect to a phenomenon known as pressure drop. From the experimental evidence provided it appears that asymmetric quadrulobes suffer less from pressure drop than the closely related symmetrical quadrulobes. The asymmetrically shaped particles are described in EP-A-220933 by way of each pair of protrusions being separated by a channel which is narrower than the protrusions to prevent entry thereinto by the protrusions of an adjacent particle. It is taught in EP-A-220933 that the shape of the particles prevents them from "packing" in a bed causing the overall bulk density of the catalyst bed to be low.

Since many of the findings in the art are conflicting and pressure drop problems continue to be in existence, especially when surface-to-volume ratios are increased by reducing particle size, there is still considerable room to search for alternative shapes of (optionally catalytically active) particles which would diminish or even prevent such problems. It has now surprisingly been found that specifically shaped particles of the general "trilobal" shape offer unexpected and sizeable advantages compared with conventional "trilobal" particles, both in catalytic and non-catalytic duty.

SUMMARY OF THE INVENTION

The present invention therefore relates to an elongate, shaped particle comprising three protrusions each extending from and attached to a central position aligned along the central longitudinal axis of the particle, the cross-section of the particle occupying the area encompassed by the outer edges of six outer circles around a central circle minus the area occupied by three alternating outer circles, wherein each of the six outer circles is touching two neighbouring outer circles and wherein three alternating outer circles are equidistant to the central circle, have the same diameter, and may be attached to the central circle.

Figure 1:
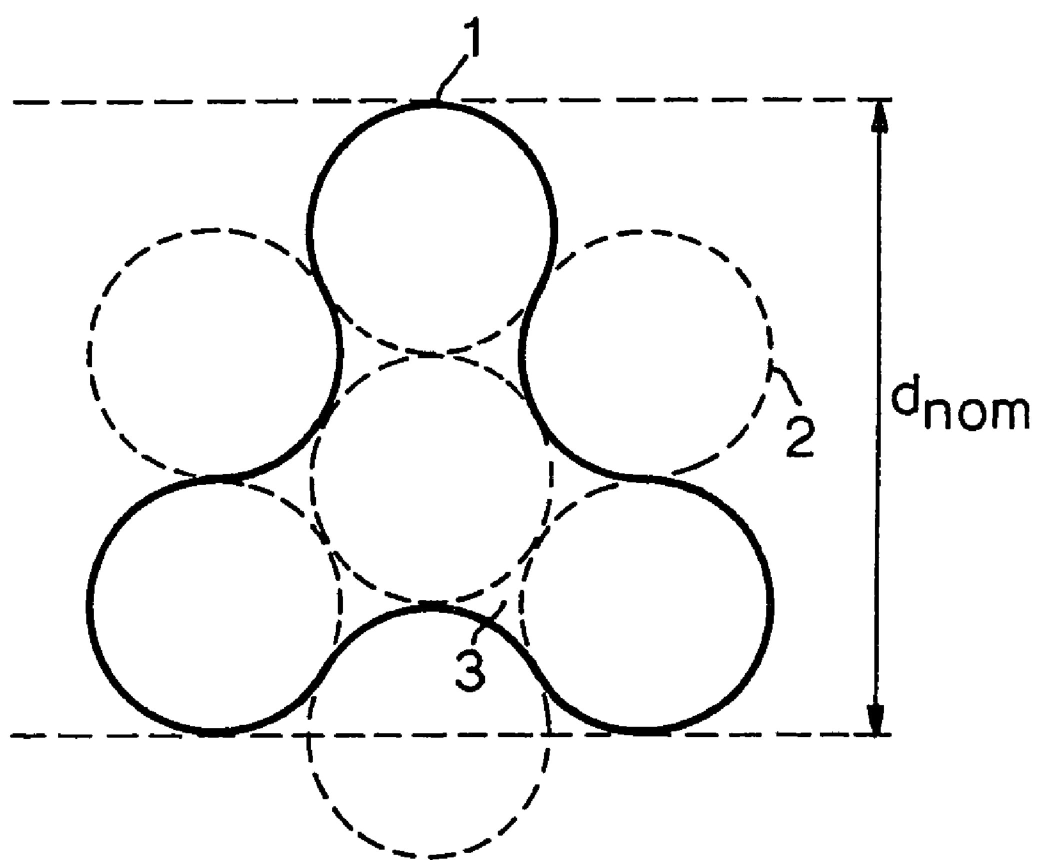
FIG. 1 a cross-sectional view of the most preferred particles according to the invention has been depicted.

It has been found that the particles according to the present invention, having a larger surface-to-volume ratio than corresponding conventional "trilobal" particles of similar size, suffer substantially less from pressure drop than such corresponding conventional "trilobal" particles. Moreover, the shape of the particles according to the present invention allows a certain degree of "packing" which according to the teaching of EP-A-220993 would be detrimental with respect to pressure drop.

It has also been found that particles having a shape in accordance with the present invention perform exceptionally well when used as a grading material to capture fouling, thereby guarding a fixed-bed reactor against pressure drop increase. It is also believed that catalysts based on particles in a shape according to the present invention are capable of improved performance when used in mass transfer or diffusion limited reactions in fixed-bed reactors, for instance as hydrocracking catalysts in the hydrocracking of paraffinic materials produced from synthesis gas via the Fischer-Tropsch process.

The particles according to the invention are elongate and have three protrusions, each running along the entire length of the particle. The cross-section of the particles can be described as the area encompassed by the outer edges of six circles around a central circle minus the area occupied by three alternating outer circles.

Each of the six outer circles is touching two neighbouring outer circles and does not overlap with the two neighbouring outer circles. The six outer circles can be seen as two sets of alternating outer circles, i.e. the three alternating outer circles that are within the cross-sectional area and the remaining three alternating outer circles. The three alternating circles are equidistant to the central circle, have the same diameter, and may be attached to the central circle. The distance to the central circle and the diameter of the circles may be different for both sets of alternating outer circles.

Preferred particles according to the present invention have a cross-section in which three alternating circles have a diameter in the range between 0.74 and 1.3 times the diameter of the central circle. Preferably, all six outer circles have a diameter in this range.

More preferred particles according to the present invention are those having a cross-section in which three alternating circles have the same diameter as the central circle. Preferably, all six outer circles have the same diameter as the central circle.

Most preference is given to particles having a cross-section in which three alternating circles are touching the central circle. Preferably, all six outer circles are touching the central circle.

In FIG. 1 a cross-sectional view of the most preferred particles according to the invention has been depicted. The cross-sectional area of the particle of FIG. 1 is the area within the solid line 1. It will be clear from this Figure (depicting the cross-section of the preferred particles) that in the concept of six outer circles of even size aligned around a central circle of the same size, each outer circle touches its two neighbour outer circles and the central circle whilst subtraction of three alternating outer circles (dotted line 2) provides the remaining cross-sectional area, built up from four circles (the central circle and the three remaining alternating outer circles) together with the six areas (3) formed by the inclusions of the central circle and six times two adjacent outer circles. The nominal diameter for the preferred particles is indicated as d nom in FIG. 1.

The cross-sectional circumference of the particles according to the present invention is such that it forms a smooth line, which can also be expressed as the function describing the cross-sectional circumference being continuously differentiable.

It will be clear that minor deviations from the shape as defined are considered to be within the scope of the present invention. It is known to those skilled in the art to manufacture die-plates which tolerances can be expected in practice when producing such die-plates.

It is possible to produce particles according to the present invention which also contain one or more holes along the length of the particles. For instance, the particles can contain one or more holes in the area formed by the central cylinder (the central circle in the cross-section given in FIG. 1) and/or one or more holes in one or more of the alternating cylinders (the alternating outer circles in the cross-section given in FIG. 1). The presence of one or a number of holes causes an increase of the surface-to-volume ratio which in principle allows exposure of more catalytic sites and, in any case, more exposure to incoming charges which may work advantageously from a catalytic and/or fouling rejection point of view. Since it becomes increasingly difficult to produce hollow particles as their size becomes smaller, it is preferred to use massive particles (still having their micropores) when smaller sizes are desired for certain purposes.

It has been found that the voidage of the particles according to the present invention is well above 50% (voidance being defined as the volume fraction of the open space present in a bed of particles outside the particles present, i.e. the volume of the pores inside the particles are not included in the voidage). The particles used in the experiment to be described hereinafter had a voidage of typically 58% which is substantially above that of the comparative "trilobal" particle, the voidage of which amounted to just over 43%.

The particles according to the present invention can be described as having a length/diameter ratio (L/D) of at least 2. The diameter of the particles is defined as the distance between the tangent line that touches two protrusions and a line parallel to this tangent line, that touches the third protrusion. It is indicated as d nom in FIG. 1. Preferably, the particles according to the present invention have a L/D in the range between 2 and 5. For example, the particles used in the experiment to be described hereinafter had a L/D of about 2.5.

The length of the particles in accordance with the present invention is suitably in the range between 1 and 25 mm, preferably in the range between 3 and 20 mm, depending on the type of application envisaged. For use in fouling control and in hydrodesulphurisation particles can conveniently be used which have a diameter in the range between 2 and 5 mm.

The shaped particles can be formed of any suitable material provided it is capable of being processed through die-plates giving them their intended shape. Preference is given to porous materials which can be used in catalytic as well as in non-catalytic applications. Examples of suitable materials are inorganic refractory oxides such as alumina, silica, silica-alumina, magnesia, titania, zirconia and mixtures of two or more of such materials. The choice of the material will normally depend on the envisaged application. It is also possible to use synthetic or natural zeolites, or mixtures thereof, optionally together with one or more of the refractory oxides referred to hereinabove, as the material(s) to be used to form the shaped particles according to the present invention. Good results can be obtained with (catalytically active) particles based on alumina, in particular with gamma-alumina, and various forms of silica-alumina, but other materials can also be applied satisfactorily.

In the event that the particles according to the invention are to be used in catalytic processes, the appropriate amount (s) of catalytically active metal(s) and/or metal compound(s) will have to be present on the particles, which then serve as catalyst carrier (in addition to their capacity to abate fouling as the case may be). Those skilled in the art know which metal(s) and/or metal compound(s) to apply for specific applications and also to which extent and how to incorporate the chosen moieties on the particles envisaged.

When, for instance, hydrodesulphurisation of hydrocarbonaceous feedstocks is envisaged, the shaped particles according to the present invention will normally contain one or more metal(s) of Group VI and/or one or more non-noble metal(s) of Group VIII of the Periodic Table of the Elements which are conveniently present as oxides and/or as sulphides. When the expression "hydrodesulphurisation" is used throughout this specification it also includes hydrodenitrogenation and hydrogenation as these hydrotreating processes normally take place at the same time. Hydrodesulphurisation conditions normally comprise a temperature in the range between 150 and 400 degrees centigrade, a hydrogen partial pressure up to 80 bar and a LHSV in the range between 1 and 20 Nl feed/l catalyst/hr. The $H_2$/hydrocarbon feed ratio is suitably in the range from 100 to 2000 Nl/l.

The particles according to the present invention can be used advantageously in guard bed duty. Guard beds are normally applied to protect other catalytic beds downstream of the guard bed against unwanted influences caused by the feedstream to be processed over such catalytic beds.

Fouling is one of the most encountered problems when processing feedstocks through one or more catalytic beds. The fouling observed can be caused by impurities in the feedstock which were either present already or which may have been formed during the process. Examples of impurities present in the feedstock to be treated are, for instance, metal-containing particles and/or clay or salt particles which had not or had only been removed incompletely prior to processing over the appropriate catalytic bed(s). Examples of impurities formed during processing are, for instance, fragments of catalytic active particles which were removed from the catalytic bed(s) which in recycle operation are passed through such catalytic bed(s) or coke particles formed during exposure of the feedstock to (severe) process conditions.

Guard beds are normally placed upstream of the bed(s) used in the catalytic process. One or more guard beds can be used to absorb the impurities, thereby delaying the occurrence of pressure drop which allows a longer on stream time of the process envisaged. It is also possible to provide part or all of the particles forming the guard bed with catalytically active materials, thereby combining guard and reaction duty. It is also possible to incorporate catalytically active material of a different nature than that used in the process as envisaged in the particles of the guard bed. For instance, materials active in hydrotreating may be present in and/or on the particles forming the guard bed(s) having the duty to protect one or more catalyst beds used in hydrocracking and placed downstream of the guard bed. The type and amount of catalytically active materials present in such guard beds are well known in the art and those skilled in the art know how to employ them.

Specific applications for the particles according to the present invention are as grading layers to protect fixed-bed reactors prone to heavy (feedstock originating) fouling which may occur in hydroconversion, in particular in hydrodemetallisation processes, long residue hydrodesulphurisation processes and in the processing of thermally cracked material and to protect fixed-bed reactors suffering from fines deposition deep in the catalytic beds, for instance in units processing synthetic crudes.

It has been found that the beds containing particles according to the invention have—in a random packing—a much higher voidage than beds containing the corresponding conventional trilobes when packed using the well known "sock loading" technique. The voidage obtained when using the conventional trilobal shape amounts to about 45% whereas use of the particles according to the present invention produces a voidage of at least 55% which makes such particles attractive for low pressure drop applications, for instance under conditions of countercurrent gas-liquid flow.

The particles according to the present invention can also be suitably applied in a process for the production of middle distillates from synthesis gas in which heavy paraffinic material produced from carbon monoxide and hydrogen is subjected to a hydrocracking process to produce middle distillates in the presence of a catalyst containing particles according to the present invention which also contain one or more metals(s) and/or metal compound(s) possessing the desired catalytic activity.

The invention will now be illustrated by means of the following non-limiting examples.

EXAMPLE 1

Two model experiments were carried out to monitor the pressure drop under fouling conditions of catalyst particles made up of conventional trilobes (to be referred to hereinafter as TL) and of particles having a shape as shown in FIG. 1 (to be referred to hereinafter as STL—"special" trilobes, having a cross-section occupying the area inside seven circles of the same size (the central circle attached by six outer circles of the same size and three alternating outer circles forming part of the cross-section) minus the three remaining outer circles).

The TL particles had a nominal diameter of 2.5 mm, an L/D of about 2.5, and were made of gamma alumina. A randomly packed bed of the TL particles showed a voidage of 43%. They did not contain additional catalytic material.

The STL particles had a nominal diameter of 2.8 mm, an L/D of about 2.5, and consisted of material normally used for DN-200 catalysts (commercially available from Criterion Catalyst Company). A randomly packed bed of the STL particles showed a voidage of 58.3%. Both types of particles were obtained by extrusion using an appropriate die plate.

The fouling material used in the two experiments consisted of a mixture of crushed silica and FCC (Fluid Catalytic Cracking) catalyst. The composition of the fouling material is given in Table 1 below.

TABLE 1

| Size (nm) | Fraction (% w/w) | Type of material |
|---|---|---|
| 1.4–1.7 | 0.58 | silica |
| 1.18–1.4 | 0.71 | silica |
| 0.6–1.18 | 6.60 | silica |
| 0.355–0.6 | 4.51 | silica |
| 0.212–0.355 | 4.85 | silica |
| 0.125–0.212 | 7.01 | silica |
| <0.125 | 75.74 | FCC cat. |

The experiments were carried out in a single column containing the material to be tested. The column was operated with cocurrent gas (air) and liquid (water) flow at ambient temperature and pressure. Gas and liquid superficial velocities were 100 mm/s and 4 mm/s, respectively. Before each experiment, the packing was properly wetted with clean water.

The experiments started by switching the liquid feed from clean water to a slurry containing 2.94 kg.m$^3$ of the fouling material. This concentration is several orders of magnitude higher than that to be expected under normal operating conditions in order to be able to assess the phenomenon of pressure drop within a relatively short time. It was found that the run time for the TL particles (before a pressure drop of 500 mBar/m was observed) amounted to 1460 seconds whereas the use of STL particles allowed for a run time of no less than 2260 seconds, i.e. a 55% increase compared to the conventionally shaped particles.

EXAMPLE 2

Two experiments were carried out to compare flooding limits occurring when using conventional TL and particles having a shape according to the present invention (in this case, as shown in FIG. 1). The particles used in these experiments had the same shapes and compositions as those described in Example 1. A randomly packed bed of the TL particles showed a voidage of 40% and that of STL particles showed a voidage of 55%.

The experiments were carried out in a single column operated countercurrently with n-octane and nitrogen at ambient temperature and 2 bar absolute pressure. Care was taken to ensure uniform gas and liquid distribution. During the experiments, gas flow was increased at a constant liquid flow rate and pressure drop was measured across the column. The flood point is defined as the point where the pressure drop dependence on the gas velocity abruptly changes from an order between one and two to a substantial higher order.

In the experiment carried out with TL, the gas velocity at which flooding started was determined at an absolute pressure of 2 bar and a superficial liquid velocity of 3 mm/s. The STL were tested at the conditions at which the TL showed starting of flooding at 2 bara and a liquid superficial velocity of 3 mm/s. At these conditions, the gas velocity could be increased as much as 3.4 times before the STL showed the onset of flooding. The use of STL, therefore, delayed reaching of flooding conditions substantially.

The invention claimed is:

1. An elongate, shaped particle formed from a porous material comprising three protrusions each extending from and attached to a central position aligned along the central longitudinal axis of the particle, the cross-section of the particle occupying the area encompassed by the outer edges of six outer circles around a central circle minus the area occupied by three alternating outer circles, wherein each of the six outer circles is touching two neighbouring outer circles and wherein three alternating outer circles are equidistant to the central circle, have the same diameter, and may be attached to the central circle.

2. The particle according to claim 1, wherein three alternating outer circles have a diameter in the range between 0.74 and 1.3 times the diameter of the central circle.

3. The particle according to claim 2, wherein three alternating outer circles have the same diameter as the central circle.

4. The particle according to claim 3, wherein three alternating outer circles are attached to the central circle.

5. The particle according to claim 4, having a L/D ratio of at least 2.

6. The particle according to claim 5, having a L/D ratio in the range between 2 and 5.

7. The particle according to claim 6, having a length in the range between 1 mm and 25 mm.

8. The particle according to claim 7, which has been formed from alumina, silica, silica-alumina, magnesia, titania, zirconia, a synthetic or natural zeolite or mixtures of two or more of these materials.

9. The particle according to claim 8, containing a metal or a metal compound or both having catalytic activity.

10. The particle according to claim 9, containing a metal or a metal compound or both having hydroprocessing activity.

11. The guard bed containing particles according to claim 1.

12. The process for reducing fouling or the impact of fouling deposition in catalyst beds which comprises contacting a charge containing fouling material with a layer of particles according to claim 1.

13. The process for the conversion of an organic charge comprising contacting the charge with a catalyst containing particles according to claim 9.

14. The process according to claim 13, in which the conversion comprises hydrodesulphurisation of a hydrocarbonaceous feedstock.

15. The process for the production of middle distillates from synthesis gas in which heavy paraffinic material produced from carbon monoxide and hydrogen is subjected to a hydrocracking process to produce middle distillates in the presence of a catalyst containing particles according to claim 1, and which contain a metal or a metal compound possessing hydrocracking activity.

16. The process for the conversion of hydrocarbons when carried out under conditions of countercurrent gas-liquid flow in the presence of particles according to claim 1.

17. The particle according to claim 1, wherein three alternating outer circles are attached to the central circle.

18. The particle according to claim 2, wherein three alternating outer circles are attached to the central circle.

19. The particle according to claim 1, having a L/D ratio of at least 2.

20. The particle according to claim 2, having a L/D ratio of at least 2.

21. The particle according to claim 3, having a L/D ratio of at least 2.

22. The particle according to claim 1, having a length in the range between 1 mm and 25 mm.

23. The particle according to claim 2, having a length in the range between 1 mm and 25 mm.

24. The particle according to claim 3, having a length in the range between 1 mm and 25 mm.

25. The particle according to claim 4, having a length in the range between 1 mm and 25 mm.

26. The particle according to claim 5, having a length in the range between 1 mm and 25 mm.

27. The particle according to claim 1, which has been formed from alumina, silica, silica-alumina, magnesia, titania, zirconia, a synthetic or natural zeolite or mixtures of two or more of these materials.

28. The particle according to claim 2, which has been formed from alumina, silica, silica-alumina, magnesia, titania, zirconia, a synthetic or natural zeolite or mixtures of two or more of these materials.

29. The particle according to claim 3, which has been formed from alumina, silica, silica-alumina, magnesia, titania, zirconia, a synthetic or natural zeolite or mixtures of two or more of these materials.

30. The particle according to claim 4, which has been formed from alumina, silica, silica-alumina, magnesia, titania, zirconia, a synthetic or natural zeolite or mixtures of two or more of these materials.

31. The particle according to claim 5, which has been formed from alumina, silica, silica-alumina, magnesia, titania, zirconia, a synthetic or natural zeolite or mixtures of two or more of these materials.

32. The particle according to claim 6, which has been formed from alumina, silica, silica-alumina, magnesia, titania, zirconia, a synthetic or natural zeolite or mixtures of two or more of these materials.

33. The particle according to claim 1, containing a metal or a metal compound or both having catalytic activity.

34. The particle according to claim 2, containing a metal or a metal compound or both having catalytic activity.

35. The particle according to claim 3, containing a metal or a metal compound or both having catalytic activity.

36. The particle according to claim 4, containing a metal or a metal compound or both having catalytic activity.

37. The particle according to claim 5, containing a metal or a metal compound or both having catalytic activity.

38. The particle according to claim 6, containing a metal or a metal compound or both having catalytic activity.

39. The particle according to claim 7, containing a metal or a metal compound or both having catalytic activity.

40. The process for reducing fouling or the impact of fouling deposition in catalyst beds which comprises contacting a charge containing fouling material with a layer of particles according to claim 2.

41. The process for reducing fouling or the impact of fouling deposition in catalyst beds which comprises contacting a charge containing fouling material with a layer of particles according to claim 3.

42. The process for reducing fouling or the impact of fouling deposition in catalyst beds which comprises contacting a charge containing fouling material with a layer of particles according to claim 4.

43. The process for reducing fouling or the impact of fouling deposition in catalyst beds which comprises contacting a charge containing fouling material with a layer of particles according to claim 5.

44. The process for reducing fouling or the impact of fouling deposition in catalyst beds which comprises contacting a charge containing fouling material with a layer of particles according to claim 6.

45. The process for reducing fouling or the impact of fouling deposition in catalyst beds which comprises contacting a charge containing fouling material with a layer of particles according to claim 7.

46. The process for reducing fouling or the impact of fouling deposition in catalyst beds which comprises contacting a charge containing fouling material with a layer of particles according to claim 8.

47. The process for reducing fouling or the impact of fouling deposition in catalyst beds which comprises contacting a charge containing fouling material with a layer of particles according to claim 9.

48. The process for reducing fouling or the impact of fouling deposition in catalyst beds which comprises contacting a charge containing fouling material with a layer of particles according to claim 10.

49. The process for the conversion of an organic charge comprising contacting the charge with a catalyst containing particles according to claim 10.

50. The process-for the production of middle distillates from synthesis gas in which heavy paraffinic material produced from carbon monoxide and hydrogen is subjected so a hydrocracking process to produce middle distillates in the presence of a catalyst containing particles according to claim 2, and which contains a metal or a metal compound or both possessing hydrocracking activity.

51. The process for the production of middle distillates from synthesis gas in which heavy paraffinic material produced from carbon monoxide and hydrogen is subjected to a hydrocracking process to produce middle distillates in the presence of a catalyst containing particles according to claim 3, and which contains a metal or a metal compound or both possessing hydrocracking activity.

52. The process for the production of middle distillates from synthesis gas in which heavy paraffinic material produced from carbon monoxide and hydrogen is subjected to a hydrocracking process to produce middle distillates in the presence of a catalyst containing particles according to claim 4, and which contains a metal or a metal compound or both possessing hydrocracking activity.

53. The process for the production of middle distillates from synthesis gas in which heavy paraffinic material produced from carbon monoxide and hydrogen is subjected to a hydrocracking process to produce middle distillates in the presence of a catalyst containing particles according to claim 5, and which contains a metal or a metal compound or both possessing hydrocracking activity.

54. A The process for the production of middle distillates from synthesis gas in which heavy paraffinic material produced from carbon monoxide and hydrogen is subjected to a hydrocracking process to produce middle distillates in the presence of a catalyst containing particles according to claim 6, and which contains a metal or a metal compound or both possessing hydrocracking activity.

55. The process for the production of middle distillates from synthesis gas in which heavy paraffinic material produced from carbon monoxide and hydrogen is subjected to a hydrocracking process to produce middle distillates in the presence of a catalyst containing particles according to claim 7, and which contains a metal or a metal compound or both possessing hydrocracking activity.

56. The process for the production of middle distillates from synthesis gas in which heavy paraffinic material produced from carbon monoxide and hydrogen is subjected to a hydrocracking process to produce middle distillates in the presence of a catalyst containing particles according to claim 8, and which contains a metal or a metal compound or both possessing hydrocracking activity.

57. The process for the conversion of hydrocarbons when carried out under conditions of countercurrent gas-liquid flow in the presence of particles according to claim 2.

58. The process for the conversion of hydrocarbons when carried out under conditions of countercurrent gas-liquid flow in the presence of particles according to claim 3.

59. The process for the conversion of hydrocarbons when carried out under conditions of countercurrent gas-liquid flow in the presence of particles according to claim 4.

60. The process for the conversion of hydrocarbons when carried out under conditions of countercurrent gas-liquid flow as the presence of particles according to claim 5.

61. The process for the conversion of hydrocarbons when carried out under conditions of countercurrent gas-liquid flow in the presence of particles according to claim 6.

62. The process for the conversion of hydrocarbons when carried out under conditions of countercurrent gas-liquid flow in the presence of particles according to claim 7.

63. The process for the conversion of hydrocarbons when carried out under conditions of countercurrent gas-liquid flow in the presence of particles according to claim 8.

64. The process for the conversion of hydrocarbons when carried out under conditions of countercurrent gas-liquid flow in the presence of particles according to claim 9.

65. The process for the conversion of hydrocarbons when carried out under conditions of countercurrent gas-liquid flow in the presence of particles according to claim 10.

* * * * *